Patented Aug. 23, 1938

2,127,524

UNITED STATES PATENT OFFICE 2,127,524

PROCESS OF MANUFACTURING MILK POWDER

Ninni Maria Kronberg, Rydsgard, Sweden

No Drawing. Application December 22, 1933, Serial No. 703,671. In Sweden January 9, 1933

5 Claims. (Cl. 99—203)

This invention relates to a milk powder and a process for the production of the same.

An object of this invention is to produce an improved milk powder which, when dissolved will have an enhanced resistance to injurious bacteria as compared with the milk powders at present on the market.

A further object of this invention is to produce an improved milk powder, which will be suitable for household use in the preparation of foods, particularly in hot climates and will be technically adequate milk substance in the manufacture of chocolate and sweetmeats.

In the practice of the present invention, two separate portions of milk material are prepared for processing. Either skimmed milk or full-cream milk may be employed for the portions which may be of the same or different compositions. Skimmed milk is generally preferred for that portion which is to be acidified. Such portion is prepared by first conditioning it, generally by heating and cooling, or by moderate heating alone for acidification with an organic acid whereby the sugar content or a fraction thereof is converted. The treatment with acid is advantageously accomplished by inoculating the portion with a pure culture of lactic acid bacteria. Thereafter, the portion is emulsified or homogenized, the operation being discontinued before the proteins begin to separate.

The other portion is prepared generally by making desired additions to its composition and emulsifying. The additions may be milk or raw sugar, together with a vegetable fat if skimmed milk be used, but is preferably milk or raw sugar only if full-cream milk be used.

To produce a milk powder of the character most generally desired, it is found best to limit the portion which is treated with acid to an amount not greater than one fifth of the whole batch comprising the two portions which is processed at one time.

After the portions are emulsified, they are dried by spraying them either together or separately into a drying chamber under the influence of an electric stress, the drying atmosphere being circulated hot air that is maintained at a temperature below the boiling point of water. The drying operation thus carried out atomizes the milk material into minute particles that are charged electrically and repel one another in the drying chamber. Coalescence of the particles is thus avoided and a very uniform product results.

The resulting milk powder is found to have a high concentration of lactiferous matter.

Storage tests carried out over a period of a year have shown that milk powder, produced in accordance with the invention, exhibits an improvement in quality over other milk powders on the market in that the powder retains its light powder form and color and does not agglomerate into hard lumps or cakes.

Also, tests have revealed that, at a temperature of 24 degrees C., the present milk powder has relatively great resistance to the effects of injurious bacteria when it is dissolved in water.

The minor portion of milk material, instead of being treated for the development of cultivated lactic acid, as above described, may be treated directly with pure lactic acid, that is, such as is free from the bacterial culture by means of which it was produced, since it has been shown that such pure lactic acid, whether technical or chemical, possesses on the whole parallel qualities to that containing bacteria.

Any convenient apparatus may be employed for carrying out the operations of the process. The drying operation is advantageously accomplished in a rotating cylindrical chamber into which the material being atomized is introduced by means of a diffuser. An electric field for impressing the stress is provided by connecting the chamber and the diffuser in a suitable electric circuit.

Below are given examples which illustrate specifically various ways in which the operations practiced by the invention may be carried out.

Example I

A batch consisting of two portions of suitable milk material, such as skimmed milk, is prepared, the batch comprising any convenient total amount, for example, 1000 litres, of which the portions are taken in amounts of 200 and 800 litres, respectively. These are processed as follows:

The portion consisting of 200 litres of skimmed milk is heated to a temperature of about 120 degrees C. and then cooled to about 35 degrees C., at which temperature it is treated with pure cultures of lactic acid bacteria, for example, *B. casei* and *Streptococcus lactious*. The portion is then emulsified while being cooled to a temperature at or below room temperature, i. e., from 35 degrees C. to 18 degrees C. During this operation the milk sugar is converted into lactic acid according to the equation:

$$C_{12}H_{22}O_{11} + H_2O = 4CH_3.CHOH.COOH$$

This operation is discontinued before the proteins begin to separate.

The 800-litre portion of skimmed milk is also emulsified, and during the emulsification at about 20 degrees C., not less than 5 kgms. of either milk or raw sugar and not less than 5 kgms. of liquid vegetable fat are added. Where full-cream milk is used, not less than 4 kgms. of milk or raw sugar alone are added. The exact amount of additions in every case is determined by the quality of milk powder to be produced.

The two portions of treated milk are dried simultaneously by spraying them either separately or together into a drying chamber at 80 degrees C., in which they are atomized under heat in a current of circulating hot air, which atomization takes place under the influence of a weak atmospheric electrical discharge. This is effected by diffusing the atomized particles in the circulating hot air by the action of the electrical discharge in a rotating cylindrical chamber.

A typical analysis of a skimmed milk powder produced according to the above described operations is as follows:

|   | Per cent |
|---|---|
| Water | 5.89 |
| Main constituents calculated on the dry substance: | |
| Ash | 6.1 |
| Fat | 0.9 |
| Casein | 23.3 |
| Direct reducing sugars (calculated as milk sugar) | 44 |
| Reducing sugar after inversion (calculated as milk sugar) | 16 |

When using lactose or cane sugar for the manufacture of so-called sweetened dry milk or condensed milk products, the sugar substance may first be dissolved in the minor portion of milk and treated with cultivated lactic acid bacteria, after which lactic acid is added to the portion and the whole heated to a suitable temperature to convert the sucrose into dextrose and levulose, and the lactose into dextrose and galactose. The minor portion of milk thus treated is then subjected to the method of producing dry milk as hereinbefore described.

The following is given as a second example to illustrate the above described modification of the process:

Example II

A batch of 1000 litres of suitable milk material is prepared, as in the former example. In this case, however, the minor portion should be smaller. The processing may then take place as follows:

About 100 litres of the batch is used and when at a temperature of about 35 degrees C. is inoculated with cultivated lactic acid bacteria. This portion is thereupon heated to about 60 degrees C., when about 20 kilos of cane sugar and about 200 grammes of pure lactic acid are added and then left to invert at the above-mentioned temperature. The invert percentage is fixed here by the time allowed for the reaction. The other portion consisting of about 900 litres is emulsified and treated in substantially the same manner as described above in Example I; these two portions being then reduced to powder by drying in accordance with the invention.

When cane sugar is being added in the procedure last described, it may be first dissolved in water or whey, after which lactic acid is added, the whole being then heated to a suitable temperature to convert the cane sugar to dextrose and levulose while any lactose present in the whey is converted to dextrose and galactose.

Pure lactic acid, whether technical or chemical but free from the bacterial cultures by which such acid was produced, has been found to possess in the main the same qualities as that conveying the bacteria, and a suitable quantity of pure lactic acid may be added to the milk employed, for instance, during the heating of the milk. Also other organic acids, such as tartaric acid, citric acid, or other fruit acids, preferably such as are free from the bacterial culture by means of which they were produced, can be added to the milk material, and especially to that portion thereof which is treated for the formation of cultivated lactic acid or which is treated with technically or chemically pure lactic acid in addition to or in lieu of the treatment for forming cultivated lactic acid.

Since certain changes in carrying out the above process, and certain modifications in the product embodying the invention may be made without departing from its scope, it is intended that all matter contained in the above description shall be interpreted as illustrative and not in a limiting sense.

Having described my invention, what I claim as new and desire to secure by Letters Patent is:

1. A process for producing a powdered milk product which comprises preparing two separate portions of milk material, conditioning one of said portions by bringing it to a desired temperature and treating with an organic acid conducive to conversion of at least a portion of the sugar content into invert sugar, then emulsifying without permitting the proteins to separate, modifying the other portion with desired additions and emulsifying, and thereafter drying said emulsified portions together by atomization under the influence of an impressed electric stress.

2. A process for producing a powdered milk product which comprises preparing major and minor portions of milk material, conditioning the minor portion by bringing the same to a desired temperature and treating with lactic acid whereby at least a portion of the sugar content is converted, then emulsifying said minor portion while being cooled without causing the proteins to separate, modifying the major portion with desired additions and emulsifying, and thereafter drying said emulsified portions simultaneously by atomization under the influence of an impressed electric stress.

3. A process of producing a powdered milk product which comprises preparing major and minor portions of milk material, heating the minor portion to a temperature above the boiling point of water, cooling the same to a temperature not greatly above normal room temperature, inoculating the same with lactic acid bacteria to produce lactic acid and convert at least a portion of the sugar content into invert sugar, then emulsifying said minor portion while being cooled below room temperature without causing the proteins to separate, modifying said major portion with desired additions and emulsifying, and thereafter drying said emulsified portions simultaneously by atomization under the influence of an impressed electric stress.

4. A process for producing a powdered milk product which comprises preparing two similar separate portions of milk material, conditioning one of said portions by heat exchange for treatment with an organic acid, conditioning the other of said portions with homogenization, and thereafter drying the conditioned portions by atomization under the influence of an impressed electric stress; said dried portions together forming the product.

5. A process for producing a powdered milk product which comprises preparing two similar separate portions of milk material, conditioning one of said portions by heat exchange for treatment with an organic acid conducive to the conversion of the sugar content into invert sugar, then homogenizing said portion, conditioning the other of said portions with homogenization, and thereafter drying said portions together by atomization under the influence of an impressed electric stress; whereby the resultant mixture forms the product.

NINNI MARIA KRONBERG.